United States Patent Office 2,798,877
Patented July 9, 1957

2,798,877

POLYMERIZED GLYCOL SULFITE AND PROCESSES OF PREPARING THE MONOMER AND POLYMER OF GLYCOL SULFITE

Marcel Jean Viard, Bois-Colombes, France, assignor to Societe Anonyme des Manufactures des Glaces et Produits Chimiques de Saint-Gobain, Chauny & Cirey, Paris, France No Drawing. Application December 15, 1949, Serial No. 133,215

Claims priority, application France December 30, 1948

1 Claim. (Cl. 260—327)

This invention relates to the manufacture of glycol sulfite monomer and to the manufacture of polymerized glycol sulfite. Glycol sulfite was prepared by Majima and Simanuki, (Proceedings of the Tokyo Academy Tome 2, pages 544 to 546), by the action of thionyl chloride on glycol at boiling. That process was expensive and was attended by secondary reactions which produced ethylene chloride and dimished the yield. Polymerized glycol sulfite is a new material. According to the dictionaries, the word "glycol," when not specifically defined as a higher homologue, signifies ethylene glycol, and it is so used herein.

It is an object of the invention to prepare glycol sulfite with technical and economic efficiency. Another object is to prepare polymers of glycol sulfite.

A further object is to prepare the polymers of glycol sulfite directly from the raw materials that are employed in making glycol sulfite and without a preliminary isolation of the glycol sulfite monomer.

The objects of the invention are accomplished, generally speaking, by submitting the primary compound represented by the formula:

$$C_2H_4O \cdot SO_2$$

by simple contact to the catalytic action of selected catalysts.

In carrying out the invention one may start with ethylene oxide, which is capable of reacting at low temperature, for instance at 0° C., with sulfur dioxide, producing an additional compound which is liquid, very volatile, boils around 20° C. at 760 mm. of mercury, and to which may be assigned the formula hereinabove. A similar compound has been prepared by Campbell, U. S. P. 2,381,257.

These catalysts are the organic-radical-substituted hydrides of the members of the fifth group of the periodic table. The preferred members of this class of catalysts are the organic amines, amides, sulfamides, and phosphines. The organic amines can be primary, secondary, tertiary, polyamines, and heterocyclic bases, like pyridine. The tertiary amines and the heterocyclic bases give preferred results.

The catalyst is made by replacing one or more of the hydrogen atoms, of a compound consisting of hydrogen and an element of the fifth group of the periodic table, by an organic radical. The organic radicals can be aliphatic, aromatic or heterocyclic.

When this primary compound is mixed with a catalyst of the designated class it is transformed little by little to a viscous product, the transformation proceeding by isomerization and polymerization. This transformation is marked by a rapid rise in temperature, even to 60–80° C., unless the reaction mass is vigorously cooled.

The product produced is entirely new and is constituted by polymerized glycol sulfite. This constitution is confirmed by the fact that hydrolysis of the new compound by water at the boil breaks it down into glycol and sulfur dioxide gas. Furthermore, when these polymers are heated above 140° C., for instance to the range 140–150° C., they are transformed almost quantatively to glycol sulfite monomer.

In practice, the primary compound boiling at 20° C. at ordinary pressure, and the reaction liberating heat, the temperature of the reaction should be kept low. It may conveniently be in the range 0–10° C. The quantity of catalyst may satisfactorily be on the order of 3–5% of the weight of the primary compound, although this percentage is by no means a limitation. Under these circumstances, the time of contact necessary to obtain a complete transformation to polymer is generally on the order of 20 to 30 hours at a temperature of 0–10° C. and at atmospheric pressure. If higher pressures are employed the reaction is accelerated. Agitation also accelerates the reaction.

According to a variation of the invention, the primary compound which is to be transformed to polymerized glycol sulfite may be transformed in situ without being separated. According to this process, a mixture of equimolecular proportions of ethylene oxide and sulfur dioxide are reacted in the presence of a selected catalyst, and the primary compound is transformed as it is formed, directly to the polymer of glycol sulfite. In this case there may be used of catalyst 3–5% of the weight of the ethylene oxide. The end of the reaction is marked by the disappearance of the odor of sulfur dioxide gas. The stages of the reaction can be followed by treating withdrawn portions of the reaction mass with equal volume of alcohol or benzene; the polymer precipitates and the $C_2H_4O \cdot SO_2$ remains in solution.

The polymer of glycol sulfite is obtained as an extremely viscous material, heavier than water, and slightly colored yellow or orange. The intensity of coloration varies according to the catalyst employed. Thus, it is orange yellow with diethylaniline and almost colorless with pyridine. Polymerized glycol sulfite is almost insoluble in water, alcohol, and benzene, but it is soluble in monomeric glycol sulfite. Monomeric glycol sulfite is soluble in benzene and alcohol, which distinguishes it clearly from its polymer. The following examples illustrate and do not limit the invention.

Example 1

500 grams of primary compound, hereinabove described, were added to 20 grams of pyridine and left for 30 hours at a temperature between 0 and 5° C. 490 grams of viscous polymerized glycol sulfite was produced, constituting a yield of 98%. The glycol sulfite polymer thus obtained was heated to 140–150° C. for between a half hour and an hour. Distillation produced several grams of the primary compound, which may be an oxonium compound. The mass was chilled and distillation was carried out at 20 mm. of mercury and 70–71° C., producing monomeric glycol sulfite with a yield of about 97% of theoretical.

Example 2

40 grams of diethylaniline was passed into 920 grams of ethylene oxide at a temperature 0 and 10° C. and 1340 grams of $SO_2$ were passed into the mixture and dissolved therein. The reaction mass was kept for about 30 to 40 hours between 0 and 10° C. The product was fluid at the beginning but became more and more viscous as the reaction proceeded. The end of the reaction was signalized by the disappearance of the odor of sulfur dioxide gas. 2260 grams of glycol sulfite were obtained. 2320 grams of the polymer thus obtained were heated to a temperature of 140–150° C. at ordinary pressure for 30 to 60 minutes, producing by distillation 150 grams of primary compound. The mass was chilled to 70–71° C. and at 20 mm. of pressure produced, by distillation, 1960 grams of glycol sulfite monomer. This represented a 90% yield of monomer, account being taken of the grams of primary compound recovered.

The invention contemplates:

(1) A process of making polymerized glycol sulfite which includes submitting the compound represented by formula $(CH_2)_2$—O—$SO_2$, resulting from the combination of ethylene oxide with $SO_2$, to contact with a catalyst chosen from the class produced by the replacement of one or more atoms of hydrogen by organic radicals in the compounds of hydrogen with the elements of the fifth group. These catalysts may be called organic substituted hydrides of elements of the fifth group.

(2) A modification of the process described in (1) in which a mixture of ethylene oxide with the catalysts is treated by $SO_2$ gas, the $(CH_2)_2$—O—$SO_2$ transforming itself in the nascent state, in situ, to polymerized glycol sulfite, as it is formed.

(3) That the processes (1) and (2) proceeds favorably between 0 and 10° C. at ordinary pressure.

(4) The transformation of polymerized glycol sulfite to monomeric glycol sulfite by heating above 140° C. This constitutes a very simple method of producing the monomer.

(5) That a particularly advantageous part of the invention is involved in the use of tertiary amines or pyridine as catalysts.

(6) The employment of 3–5% by weight of catalyst based on the weight of the primary compound or the ethylene oxide is generally adequate and advantageous.

(7) The new and useful materials, polymerized glycol sulfite.

As many apparently widely different embodiments of the present invention may be made without departing from the spirit and scope thereof, it is to be understood that the invention is not limited to the specific embodiments.

What is claimed is:

The method of preparing a polymer of glycol sulfite that comprises mixing 920 parts ethylene oxide and 40 parts of diethylaniline, passing 1340 parts $SO_2$ gas into the mixture at 0–10° C., and maintaining the mass at 0–10° C. for 30–40 hours.

References Cited in the file of this patent

UNITED STATES PATENTS

| | | |
|---|---|---|
| 2,253,775 | Frey | Aug. 26, 1941 |
| 2,381,257 | Campbell | Aug. 7, 1945 |
| 2,465,915 | Myles et al. | Mar. 26, 1949 |
| 2,497,135 | Myles I | Feb. 14, 1950 |
| 2,576,138 | Pechukas | Nov. 27, 1951 |

OTHER REFERENCES

Kitasato et al.: Ber., vol. 64, pp. 1142–1145 (1935).